United States Patent [19]

Sundstrom

[11] 4,101,283

[45] Jul. 18, 1978

[54] DISPOSABLE REAGENT CONTAINER AND ACTUATION MECHANISM

[76] Inventor: Karl Erik Sundstrom, 114, ch. de La Montagne, 1224 Chene-Bougeries, Geneva, Switzerland, 1224

[21] Appl. No.: 704,927

[22] Filed: Jul. 13, 1976

[51] Int. Cl.[2] ........................ G01N 1/14; G01F 11/06

[52] U.S. Cl. ................................ 23/259; 73/425.4 R; 73/425.6; 222/333; 222/50

[58] Field of Search ............. 23/259, 242, 253, 230 B; 73/425.6, 425.4 P, 425.4 R; 222/50, 333; 141/25, 26, 27, 18

[56] References Cited

U.S. PATENT DOCUMENTS

| | | | |
|---|---|---|---|
| 3,184,122 | 5/1965 | Nerenberg | 23/259 X |
| 3,343,539 | 9/1967 | Moorhouse | 73/425.6 X |
| 3,492,876 | 2/1970 | Bull et al. | 23/259 X |
| 3,493,503 | 2/1970 | Mass | 23/230 B |
| 3,525,592 | 8/1970 | Buckley | 23/259 X |
| 3,712,794 | 1/1973 | Farr | 23/259 |
| 3,805,998 | 4/1974 | Croslin | 23/259 X |
| 3,855,867 | 12/1975 | Roach | 73/425.6 |
| 3,931,915 | 1/1976 | Downings et al. | 222/333 X |
| 3,955,423 | 5/1976 | Ohringer | 23/230 B |
| 4,016,765 | 4/1977 | Lee | 23/292 X |

*Primary Examiner*—R.E. Serwin
*Attorney, Agent, or Firm*—Gilbert L. Wells

[57] ABSTRACT

A pipetter diluter for sampling and delivery of a volumetric material. The pipetter diluter has a sampling and delivery tip connected to a cylindrical container. A threaded plunger is rotated by its threads for movement in and out of the inside surface of the cylindrical container. The in and out movement of the plunger facilitates sampling and delivery of the volumetric material.

19 Claims, 5 Drawing Figures

DISPOSABLE REAGENT CONTAINER AND ACTUATION MECHANISM

The present invention relates to chemical laboratory work in storage, transport and/or distribution of reagents from the manufacturer to the end user in the laboratories and also in the use of reagents in the laboratory in accurately pipetting specified, digitally programmed, volumes of sample and the delivery of likewise specified, digitally programmed, volumes of reagent.

The present invention is concerned with a novel low cost disposable reagent container and a novel digitally controlled actuation mechanism that operates on the container in such a way that the container acts as a pipetter diluter without valves and interconnected tubing.

The invention solves the problem of volumetric determination of samples and reagents through digital programming and signal processing technology.

In common practice today reagents are delivered to the laboratory in conventional bottles. From these bottles metered volumes are delivered. There is a whole spectrum of commercially available volumetric devices, from the simple manual type where a quantity of liquid is sucked up into a graded tube or cavity (the pipette) and blown out again as a metered quantity to the fully automatic type of devices where the reagent is drawn into a syringe from the reagent bottle or reagent container and pushed out again as metered quantity determined by the stroke of the plunger of the syringe and its diameter.

In a pipetter diluter one is concerned with two different volumes, one specified volume of sample is drawn up into a probe tip and is later flushed out with a second specified volume of reagent. Such systems today have two syringes or pumps, one for sample and one for reagents. The pumps and the reagent container are interconnected by tubings and valves.

The drawbacks of these systems are that valves are costly to design and manufacture, and are often a source of trouble and malfunction. Furthermore, valves and interconnecting tubing need to be flushed and rinsed and primed with new reagent when one wants to change reagent in the system. Thus reagent is wasted, apart from the fact that the operation is time-consuming and troublesome.

The present invention overcomes these shortcomings by unifying (1) reagent storage, (2) sample syringe, and (3) reagent syringe in one single unit, thus avoiding all transfer and the necessity for interconnecting tubing and valves.

In the past it has been virtually impossible to sample or deliver very small quantities say 1 part in 100,000 from the total volume of a syringe. The reason for that is that the plunger in the syringe has been moved by mechanical means and by mechanical stops to determine the volume sampled or delivered. The problem is that the plunger in a syringe has a seal that causes both friction and adhesion to the walls of the syringe.

This has to be overcome before the plunger can move. In order to overcome adhesion a certain force has to be applied. This force is slightly distorting of the mechanical linkage and stoppage system that is designed to move the plunger a given distance. When the plunger is released from adhesion the force to overcome adhesion is also released and converted into a sudden jump by the plunger and to a corresponding volume of reagent delivered. This volume is very difficult to measure and control and sets the limit for the smallest volume to be reliably handled.

The present invention overcomes this problem by applying forces to the plunger and the seal that do not move the plunger to a direct delivery when released from adhesion. The plunger is released by a rotational movement. Such a movement is substantially neutral with respect to delivery, but nevertheless has the effect of releasing the plunger from adhesion.

Another shortcoming of prior art systems is that the force on the plunger to move it to delivery is applied over a relatively large and complicated mechanical structure (several inches in size) thus elasticity and tolerances in the system are adding up to errors in controlled volume, and sets a limit for the smallest volume that can be accurately and reliably handled.

The present invention overcomes these difficulties by applying the force for moving the plunger directly between the plunger and the syringe wall. The plunger acts as a micrometer screw in the syringe base. There is no distance whatsoever between the plunger and the advancing mechanism, since the plunger advances itself with respect to the syringe wall in which it is in contact.

A drawback of prior art systems is cost. The cost is a result of the necessary high mechanical precision of the syringes and valve systems and the complexity of mechanical programming and volume-control.

There is a great potential cost-savings in going from mechanical precision and programming to electronic precision and programming.

The present invention realizes this cost reduction by a low cost disposable syringe that does not need complex valves and tubings — and by an electronic digital control programming. In its simplest form this control is accomplished by preset counters.

an embodiment of the invention will be described below with reference to the accompanying drawings.

Figure 1:
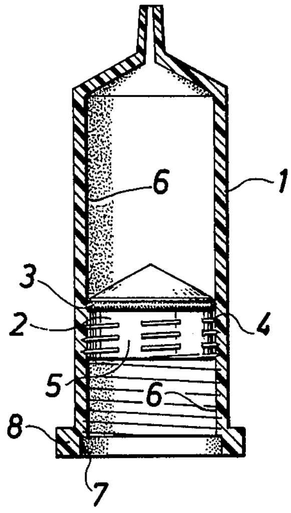
FIG. 1 shows a longitudinal section of the reagent container.

The container shown in FIG. 1 is constituted by a main body preferably made of a relatively soft but stable plastic material. The body of a standard disposable syringe of the type readily available in the market is suitable. A plunger 2 preferably molded of a hard stable plastic of polyamide type such as Durothan is arranged within the body. The plunger is provided with a seal member 3 made of silicone rubber or other soft flexible material. The seal member may be of the type used in readily available disposable syringes. The plunger has a threaded part 4 with thin thread rims. This part is slightly bigger than the base of the syringe tube, and is divided into several sectors 5. Each sector acts as a spring pressing the threads so that they penetrate into the walls 6 of the syringe and cut grooves into the wall. The spring action can be augmented by a metallic steel-spring (not shown) acting on each sector. This is of value in the case that the plunger is made of a material that has a tendency to flow thus losing its springiness over long periods of storage under strain.

The threaded part 4 of the plunger acts as a micrometer screw against the inner walls 6 of the syringe body 1. The syringe walls might be pre-threaded — since the soft seal 3 fills the threads of the syringe walls and since both plunger and seal are rotated together and plunger and seal move axially together upon rotation. The springy action of the plunger sectors guarantees that there is no backlash or free play between plunger and syringe walls.

Figure 2:
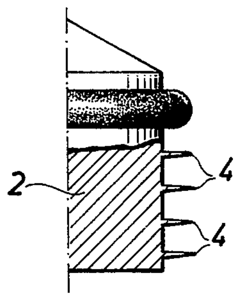
FIG. 2 is a section of a detail of FIG. 1.

However, the syringe walls are preferably not threaded but smooth. In this case the plunger acts as a self-threading screw in the syringe base. A special thread shape on the plunger is of advantage. FIG. 2 shows a schematic picture of this thread profile. It has high sharp ridges. The purpose of these knifesharp ridges is to cut a groove in the syringe walls by deforming the wall material, not by removing the material. In practice a very shallow thread is sufficient since a rotating seal has been released from adhesion, and friction is lowered when the seal is moving, and the force necessary to advance the plunger is consequently relatively low. A recess 7 is arranged in the syringe wall 6, the purpose of which is to prevent the plunger from being accidentally screwed out of the syringe. Outside the recess there is provided a flange 8.

The plunger is centrally provided with an irregulary shaped recess (not shown) the purpose of which is to engage a rotational drive shaft. The shape of the recess is suitably triangular.

Figure 4:
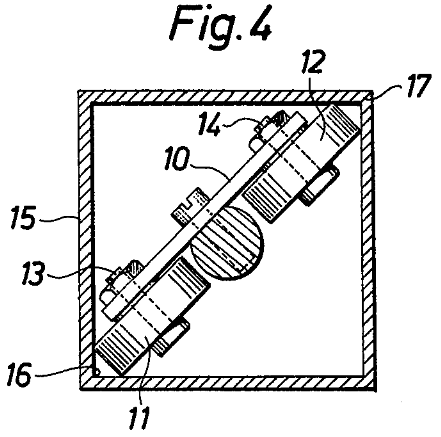
FIG. 4 shows a section along the line III—III in FIG. 3.
Figure 3:
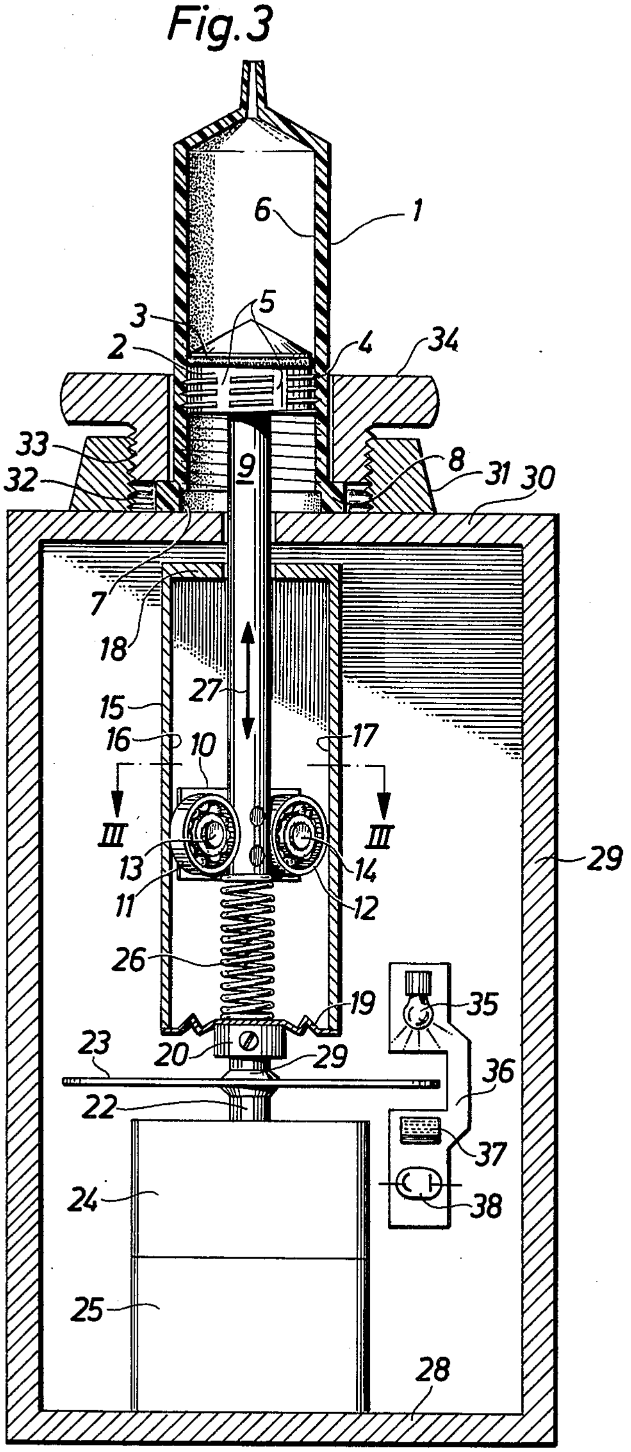
FIG. 3 shows a part sectional view of the reagent container placed in the delivery (system) mechanism.

As shown in FIG. 3 the plunger 2 is connected with a rod 9 cooperating with said triangularly shaped recess. The opposite end of the rod 9 is provided with a transversally arranged support plate 10 carrying two ball bearings 11, 12 mounted on pins 13, 14. The outer rings of the ball bearings 10, 11 are adapted to move within a tube 15 and in connection with diametrically opposite corner portions 16, 17 thereof as seen in FIG. 4. The ball bearings 11, 12 are under pressure in the tube 15. This is accomplished by making the distance between the centers of the bearings slightly too large for snug fit. The tube 15 is rotatable and the reason for loading the bearings is to minimize the play or angular backflash so that when the tube 15 is rotating the rod 9 is following in this rotation as closely as possible. The rod 9 penetrates through a hole in an end plate 18 of the tube 15 the opposite end of which is provided with a flexible disc 19. Said flexible disc 19 centrally carries a bushing 20 for connection with a shaft 22 which in turn carries a disc 23 the function of which is to be described later on. Said shaft 22 belongs to a gear train 24 which in turn is connected with a motor 25. Between the flexible disc 19 and the ball bearing and of the rod 9 is provided a weak spring 26 which keeps the outer end of the rod 9 in engagement with the plunger 2. The purpose of the flexible disc is to permit for small movements of the tube 15 and the rod 9. This minimizes the requirements for close tolerances in manufacturing without decreasing performance since the disc is very stiff torsionally. As seen in FIG. 3 the rod 9 and associated details are able to move in the direction of the double-headed arrow 27.

The motor 25 is supported by the bottom portion 28 of a housing 29. The upper flat end portion 30 of the housing 29 carries a sleeve 31 provided with inner threads 32 which cooperate with outer threads of a nut 34 adapted to press against the flange 8 of the container body 1 including the plunger 2. The flange 8 abuts against the surface of the portion 30.

The disc 23 is an optical encoder disc having say 1,000 opaque and translucent spots around its periphery. Said disc 23 cooperates with a light source 35 arranged in a support member 36 also carrying a lens 37 and a photoelectric cell 38. When the light source 35 illuminates the disc 23 there will be an image on the photoelectric cell 38. The photoelectric cell sees either dark or light spots on the disc 23 dependent upon the rotational position of the disc. One full turn of the disc gives in the present example 1,000 light pulses to the photoelectric cell 38.

Figure 5:
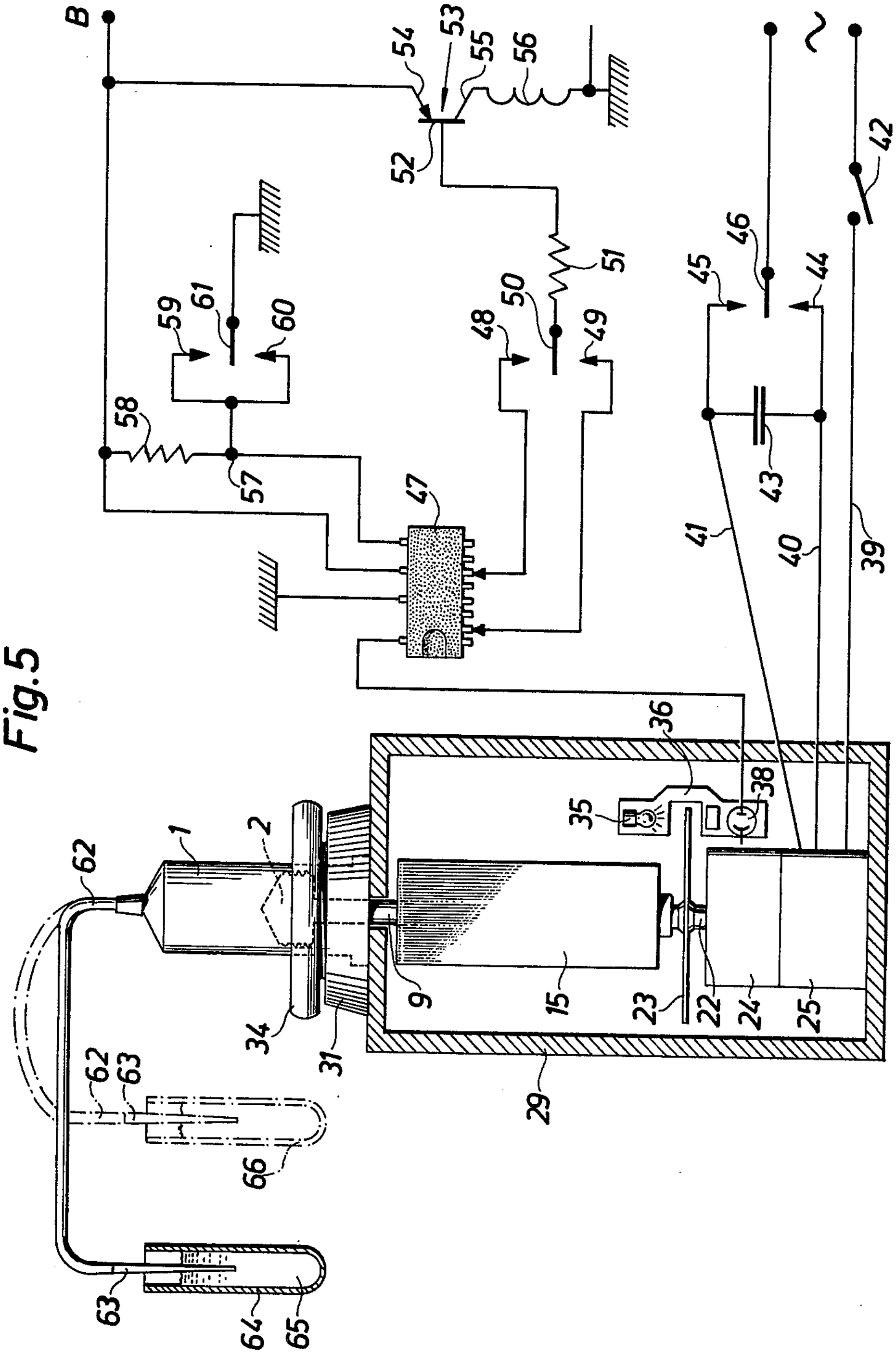
FIG. 5 is a schematic picture of the reagent container and delivery mechanism connected to a digital programmer and set up for a pipetting diluting operation.

In FIG. 5 the arrangement shown in FIG. 3 is included together with associated electrical circuits. The electrical circuits are in the form of a simple digital programming and actuation mechanism. Said circuits are simple but sufficient to operate the container and the actuator as a digitally programmed pipetter dilutor. The electrical motor 25 is a reversible AC-motor provided with three connecting wires, 39, 40 and 41. The wire 39 is connected with the mains over a relay contact 42. Between the wires 40 and 41 is connected a capacitor 43 for obtaining an artificial phase. The wire 40 is connected with one contact 44 and the wire 41 is connected with the second contact 45 of a switch 46 which in turn is connected with the other terminal of the mains. The sense of rotation of the motor thus depends on to which contact the switch 46 is connected. In the shown neutral position the motor is disconnected.

The photoelectric cell 38 is connected with the input of a binary counter 47. Said counter may be of a type readily available in the market. The counter has serial binary outputs, anyone of which at a time can be connected to either contacts 48, 49 of a switch 50 which constitute a section of the switch 46. The switch 50 is by means of a resistor 51 connected to the base 52 of a transistor 53. The emitter 54 of said transistor is connected to a voltage source B and the collector 55 thereof is connected with earth through a relay coil 56 which actuates the relay contact 42 previously mentioned. The counter 47 has a reset terminal 57 connected to the voltage source B via a resistor 58. Said terminal 57 is connected to both contacts 59 and 60 of a switch 61 which as the switch 50 is a section of the switch 46. The switch 61 is connected to earth and to the voltage source B as shown in FIG. 5.

The container 1 is by means of a hose 62 connected to a delivery tip 63 to be moved into a container 64 including sample liquid 65. Said delivery tip 63 is also adapted to be moved into a further container 66 as indicated by dotted lines. Said last mentioned container 66 is a recipient container into which a metered sample from the container 64 is to be delivered together with a metered volume of reagent from the container 1. The delivery tip 63 may be constituted by a delivery tip readily available type.

The operation of the device of FIG. 5 is as follows:

It is assumed that the switch 46 as well as the associated switches 50 and 61 are in the neutral positions. The desired sample volume is selected by connecting the appropriate output from the counter 47 to the switch contact 48 which is assumed to be the so-called sample position contact. The desired dilute volume is selected by connecting the appropiate output of the counter 47 to the contact 49 which thus is the dilute contact of the switch 50. The delivery tip 63 is placed in the sample container 64 and moved into the sample liquid 65. The lever of the switch 50 is moved to the contact 48 which is the sample position contact. Simultaneously the contacts 46 and 61 are moved to the contacts 45 and 59, respectively. This means that the counter 47 now is ready to receive pulses from the photoelectric cell 38 and the motor 25 starts running screwing the plunger 2 in the direction out of the container 1, thus taking up sample from the test liquid container 64. At the same time the photoelectric cell registers the number of bars on the disc 23 passing by and the counter 47 counts these bars. When the output terminal of the counter 5 which is connected to the contact 48 gets high, the transistor 53 will be cut off which means that there will be no active current in the relay coil 56 and hence the relay contact 42 opens and the motor stops.

The delivery tip 63 is now placed in the present reagent container 66 and switch 50 is now flipped over to the delivery position, i.e., into contact with the contact 49. This means that the switches 46 and 61 move over to their respective contacts 44 and 60. In flipping, the neutral position is passed and the counter 47 is reset because of the fact that the switch 61 opens the connection between the terminal 57 and earth. The motor now starts running in the opposite direction screwing the plunger 2 in the direction into the containers 1 thus delivering a specific volume. Delivery will continue until the counter 47 has registered enough counts to bring the output connected to the contact 49 in a high state. At this moment the transistor 53 again becomes cut off and the relay contact 42 falls and the motor 25 again stops.

The above described is a full cycle of programming sample and dilution. The whole device is very accurate and the arrangement of the plunger which screws itself in and out of the container makes it possible to practically eliminate the start friction forces. Even if there would be a heavy friction force when starting the rotation of the tube 15, rod 9 and plunger 2, the axial movement of the plunger in connection with such an unavoidable friction jump means nothing in practice. Within the scope of the invention it is possible to vary the shape of the threads 4 of the plunger 2 widely and as previously mentioned it is also possible to have the container inside wall 6 pre-threaded. It is preferable to have the container 1 in a slightly resilient material such as styrene plastic or the like which material also is easy to cut thread grooves into. In order to obtain sealing between the container wall 6 and the plunger threads 4 it is possible to have a non-linear inclination of the threads. The mechanisms for rotating the plunger may be varied within the scope of invention although the mechanism shown is a good practical solution.

The circuits for controlling the volumes may be varied to include other types of preset counters and other types of motors such as steppermotors for actuation, all within the scope of this invention.

What we claim is:

1. A volume portioning apparatus, comprising:

(a) pipe means for sampling and delivery of volumetric material;

(b) a cylindrical container having first and second ends with said first end connected to said pipe means;

(c) plunger means cooperating with the inside of said cylindrical container for movement from said second end to said first end and return; and (d) means for performing movements of said plunger means into and out of said container with rotation of said plunger means.

2. A portioning apparatus in accordance with claim 1 wherein the pipe communicating with the container is at the end thereof provided with a delivery tip.

3. A volume portioning apparatus, comprising:

(a) pipe means for sampling and delivery of a volumetric material;

(b) a cylindrical container having first and second ends with said first end connected to said pipe means;

(c) plunger means cooperating with the inside of said cylindrical container for movement from said second end to said first end and return;

(d) means for performing movements of said plunger means into and out of said container with rotation of said plunger means; and (e) means for applying an axial force to said plunger means.

4. The portioning apparatus of claim 1, wherein said container has a cylindrical inner surface and said means for performing movements comprise said plunger means provided with threads, said threads engaging said cylindrical inner surface which defines a guide for said plunger means.

5. The portioning apparatus of claim 3, wherein said means for applying an axial force comprise a shaft connected to said plunger means, said shaft being provided in the remote end thereof with a low friction sliding means axially sliding along a path member rotationally driven by motor means.

6. A portioning apparatus in accordance with claim 4, wherein the said threads of the plunger means have a knife like configuration and which are adapted to penetrate the said cylindrical inner surface of the container so as to cut thread grooves therein.

7. A portioning apparatus in accordance with claim 6, wherein the threads of the plunger means are arranged in sections around the circumference thereof.

8. A portioning apparatus in accordance with claim 9, wherein the plunger means is provided with a seal slidable relatively to the said inner cylindrical surface of the container.

9. A portioning apparatus in accordance with claim 5, wherein said path member is constituted by a tube having rectangular cross section and wherein the said low friction sliding means is constituted by a couple of ball bearings pressed against opposite corner portions of said rectangular tube, said tube being connected to said motor means for rotation.

10. A portioning apparatus in accordance with claim 9, wherein the connection between the said rectangulary shaped tube and the motor means is constituted by a flexible disc member arranged in the one end of the tube the centre portion of the disc being connected to an outgoing shaft of the motor means by means of a bushing.

11. A portioning apparatus in accordance with claim 10, wherein a spring is inserted between the said disc inside the tube and the end of said shaft for keeping the shaft in engagement with the plunger means.

12. A portioning apparatus in accordance with claim 10, wherein the outgoing shaft of the motor means carries a disc provided with indication marks along the periphery portion thereof.

13. A portioning apparatus in accordance with claim 12, wherein the last mentioned disc cooperates with a detecting device for detecting the number of indication marks which passes by upon rotation of the shaft in question.

14. A portioning apparatus in accordance with claim 13, wherein the disc is provided with holes defining said indication marks and the detecting device is constituted by a light-photo cell system.

15. A portioning apparatus in accordance with claim 14, wherein said light-photocell system is connected to a counting circuit.

16. A portioning apparatus in accordance with claim 15, wherein the connecting circuit is pre-settable and connected to operation circuits for the motor means in order to stop the motor means when said pre-set condition is fulfilled.

17. A portioning apparatus in accordance with claim 3, wherein the apparatus is included in a housing on top of which the container is clamped so that the means for applying an axial force is able to cooperate with the plunger means in the container.

18. A portioning apparatus in accordance with claim 5, wherein the motor means includes a motor and a reduction gear.

19. A portioning apparatus in accordance with claim 5, wherein the motor means includes a stepper-motor.

* * * * *